UNITED STATES PATENT OFFICE.

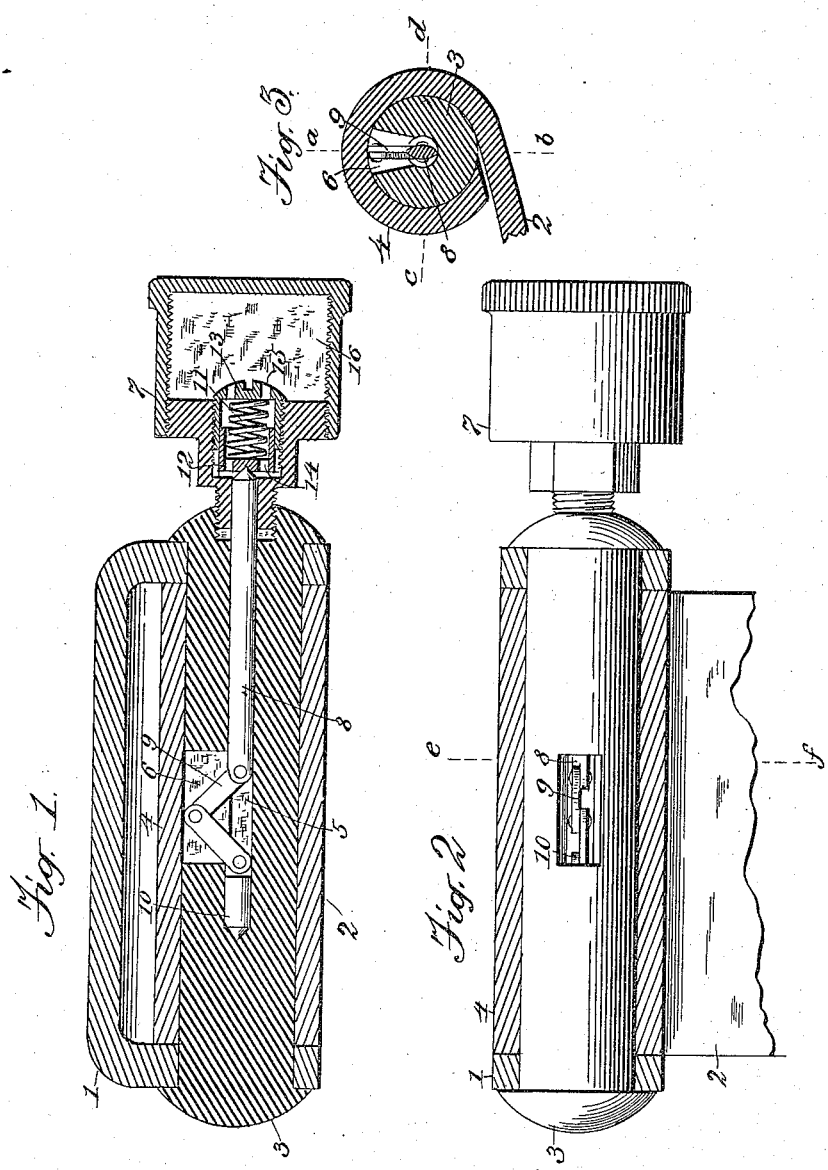

JAMES A. TEMPLEMAN, OF ANAMOSA, IOWA.

LUBRICATING DEVICE.

1,218,129.  Specification of Letters Patent.  Patented Mar. 6, 1917.

Application filed February 23, 1916. Serial No. 80,065.

*To all whom it may concern:*

Be it known that I, JAMES A. TEMPLEMAN, a citizen of the United States, residing at Anamosa, in the county of Jones and State of Iowa, have invented certain new and useful Improvements in Lubricating Devices; and I do hereby declare the following to be a full, clear, and exact description of the invention, such as will enable others skilled in the art to which it appertains to make and use the same.

This invention relates to the lubrication of bearings, and more especially the joints of carriage springs, automobile springs, and the like, The object of the invention is to provide means which will prevent the filling up of oil passages, whereby the flow of lubricant to the wearing surfaces of bearings is arrested and injurious friction ensues.

The invention consists in a member mounted so as to vibrate in the oil-hole and thus keep it open; in means for holding said member with some tension against the bearing; in a construction which admits of the apparatus being removed without disassembling the bearing, and in other details of construction, as will appear in the description and claims following.

In the drawing, forming a part of this specification, Figure 1 is a section of a device embodying my improvements, taken in the plane of the line *a b* of Fig. 3. Fig. 2 is a plan view of the same, partly sectional in the line *c d* of Fig. 3. Fig. 3 is a section in the line *e f* of Fig. 2.

The device has been designed with more particular reference to automobile springs, the hinges of which, owing to excessive vibration and other conditions of service are apt to become dry and squeak, with resulting injury to the joint, even when supplied with grease-cups and carefully attended. This is due to the filling solidly of the oil-hole leading to the bearing, in which case the bearing must needs be disassembled at the cost of much time and labor, and the stoppage relieved. My invention aims to prevent the stoppage, and in the event of such stoppage, by long use, to permit a clearance without disturbing the bearing.

Referring now to the drawing, the numeral 1 denotes the bracket connecting the spring 2 with the body of the vehicle (not shown) and commonly called the spring hanger. Through this passes the pivot-pin 3, on which the eye 4 of the spring rocks. Lubrication is usually effected through a central bore 5 and a lateral hole 6, the lubricant being supplied from a compression grease-cup 7. It is common for the lateral hole to fill with a solid mass of matter, which it is impossible to remove without a good deal of trouble.

In my improved device the central bore is provided with a push-rod 8, and to the inner end of this is connected a short linked member 9, which as the push-rod is forced inwardly turns out into the oil-hole, extended as a slot, and its outer end bears against the inner surface of the bearing. The slot is made wide enough to allow the member 9 to rock sidewise, carried back and forth by the vibration of the spring, and this vibratory motion keeps the oil-slot open. A single link would serve, but to avoid the use of a spring, or other device to turn the link outwardly when it reaches the slot, the double link shown is preferred, one being attached to the push-rod and the other to a short plug 10 seated, when in final position, at the end of the bore. The push-rod is preferably made elliptical in cross-section, as shown in Fig. 3, so as to permit the passage of lubricant beside it in the bore of the pivot-pin.

As there is a tendency for the lubricant to thicken in the outlet 6 it is desirable to force the vibrating member against the bearing with some pressure, so that the friction of the bearing will cause the member to move back and forth. This pressure is best supplied by a spring 11 acting on the outer end of the push-rod. The spring is mounted between a follower 12 and the head of a hollow screw 13 seated adjustably in the neck of the grease-cup, the follower bearing on the outer end of the push-rod. Holes 14 and 15 in the follower and screw, respectively, permit the passage of the lubricant 16. By means of the screw the tension on the vibrating member may be accurately regulated to meet requirements.

If as a result of long use the oil-slot fills, stopping the movement of the vibrator, a clearance is easily made by unscrewing the grease-cup, removing the push-rod and its connections, squirting a little gasolene in the bore, and then replacing and working the push-rod back and forth endwise.

Having thus described my invention, I claim:

1. In a lubricating device, the combination of a bearing having an internal bore and a lateral outlet, a moving member having an oscillating motion thereon, and a member mounted in said outlet, and moved back and forth by contact with said oscillating member.

2. In a lubricating device, the combination of a bearing having an internal bore and a lateral outlet, a circumferentially oscillating member mounted in said outlet, a similarly oscillating member mounted on the bearing and in contact with the member in the outlet, and means adapted to hold said members in contact.

3. In a lubricating device, a bearing internally bored and with a lateral outlet leading therefrom, a member mounted on said bearing, a vibratory member mounted in said outlet, and means mounted in the bore to impart end-thrust to said vibratory member.

4. In a lubricating device, a bearing internally bored and with a lateral outlet leading therefrom, a member mounted on said bearing, a push-pin in said bore, a link connected with its inner end and adapted to turn outwardly into said outlet, and means adapted to impart end-thrust to the push-pin.

5. Combined with a bearing having an internal bore and a lateral outlet therefrom, a divided push-pin mounted in the bore, a pair of links pivoted to each other and to the contiguous ends of the push-pin parts, and means for imparting end-thrust to the push-pin.

6. Combined with a bearing having an internal bore and a lateral outlet therefrom, a push-pin of less sectional area than the bore, a link at its inner end projecting into the outlet, a grease-cup at the outer end of the bearing communicating with said bore, and a spring pressing inwardly on said push-pin.

7. Combined with a bearing internally bored and with a lateral outlet from the bore, a grease-cup communicating with said bore, a follower mounted in said grease-cup, a spring to force said follower toward the bore, a push-pin impinging on said follower, and a link at the inner end of the push-pin turned outwardly into the outlet.

8. Combined with a bearing having an internal bore and a lateral outlet therefrom, a push-pin mounted in said bore, a link at its inner end thrust into the outlet, a perforated follower contacting with the outer end of the push-pin, a screw coöperating with said follower and perforated for the admission of lubricant, a spring between the follower and the screw, and a grease-cup communicating with said bore, screw and follower.

In testimony whereof I affix my signature in presence of two witnesses.

JAMES A. TEMPLEMAN.

Witnesses:
ALICE SLOCUM,
BURTON DAY.

Copies of this patent may be obtained for five cents each, by addressing the "Commissioner of Patents, Washington, D. C."